United States Patent
Tsai et al.

(10) Patent No.: US 9,515,326 B2
(45) Date of Patent: Dec. 6, 2016

(54) BIPOLAR PLATE FOR FUEL CELL AND FUEL CELL

(75) Inventors: Li-Duan Tsai, Hsinchu (TW);
Jiunn-Nan Lin, Taoyuan County (TW);
Chien-Ming Lai, Yilan County (TW);
Cheng-Hong Wang, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 741 days.

(21) Appl. No.: 13/565,753

(22) Filed: Aug. 2, 2012

(65) Prior Publication Data

US 2013/0157166 A1     Jun. 20, 2013

(30) Foreign Application Priority Data

Dec. 20, 2011   (TW) .............................. 100147421 A

(51) Int. Cl.
*H01M 8/0202*       (2016.01)
*H01M 8/02*         (2016.01)
*H01M 8/10*         (2016.01)

(52) U.S. Cl.
CPC ......... *H01M 8/0206* (2013.01); *H01M 8/0213* (2013.01); *H01M 8/0228* (2013.01); *H01M 8/0258* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 4,374,906 A * | 2/1983 | Breault et al. | 429/498 |
| 6,838,202 B2 | 1/2005 | Brady et al. | |
| 7,655,341 B2 | 2/2010 | Strobel et al. | |
| 7,700,212 B2 | 4/2010 | Abd Elhamid et al. | |
| 7,727,422 B2 | 6/2010 | Horiuchi et al. | |
| 7,740,971 B2 | 6/2010 | Kanba et al. | |
| 7,790,324 B2 | 9/2010 | Shibata et al. | |
| 7,830,499 B1 | 11/2010 | Corella et al. | |
| 7,897,295 B2 | 3/2011 | Vyas et al. | |
| 2003/0165730 A1* | 9/2003 | Dohle | H01M 8/0263 429/514 |
| 2005/0118490 A1* | 6/2005 | Sano et al. | 429/38 |

(Continued)

FOREIGN PATENT DOCUMENTS

| | | |
|---|---|---|
| CN | 1731608 | 2/2006 |
| CN | 1739217 | 2/2006 |

(Continued)

OTHER PUBLICATIONS

Kim et al., "Development of porous carbon foam polymer electrolyte membrane fuel cell," Journal of Power Sources 195 (2010), Oct. 29, 2009, pp. 2291-2300.

(Continued)

*Primary Examiner* — Patrick Ryan
*Assistant Examiner* — Lucas J O Donnell
(74) *Attorney, Agent, or Firm* — Jianq Chyun IP Office

(57) ABSTRACT

A bipolar plate and a fuel cell are provided. The bipolar plate for the fuel cell has a plurality of flow channels, and a rib is defined between neighboring two flow channels. A top surface of the rib may be a roughened surface or have a porous structure in order to improve performance of the fuel cell.

15 Claims, 5 Drawing Sheets

(56) References Cited

U.S. PATENT DOCUMENTS

| | | |
|---|---|---|
| 2006/0216553 A1 | 9/2006 | Lee et al. |
| 2006/0263670 A1 | 11/2006 | Tanno |
| 2008/0038609 A1* | 2/2008 | Yoshizawa ............ H01M 8/023 429/434 |
| 2008/0050618 A1 | 2/2008 | Tanno et al. |
| 2008/0102347 A1* | 5/2008 | Blunk ................ H01M 8/0204 429/514 |
| 2011/0076590 A1* | 3/2011 | Kozakai et al. ............. 429/480 |
| 2013/0288151 A1* | 10/2013 | Yoshizawa .................... 429/480 |

FOREIGN PATENT DOCUMENTS

| | | |
|---|---|---|
| CN | 1849279 | 10/2006 |
| CN | 1988233 | 6/2007 |
| CN | 101044651 A | 9/2007 |
| CN | 200965892 | 10/2007 |
| EP | 1223630 | 7/2002 |
| TW | 200301582 | 7/2003 |
| TW | 200518376 | 6/2005 |
| TW | 200635117 | 10/2006 |
| TW | 201101569 | 1/2011 |
| TW | I346409 | 8/2011 |

OTHER PUBLICATIONS

Avasarala et al, "Effect of surface roughness of composite bipolar plates on the contact resistance of a proton exchange membrane fuel cell," Journal of Power Sources 188 (2009), Nov. 27, 2008, pp. 225-229.

Tang et al., "Feasibility study of porous copper fiber sintered felt: A novel porous flow field in proton exchange membrane fuel cells," International Journal of Hydrogen Energy 35 (2010), Jul. 31, 2010, pp. 9661-9677.

Kraytsberg et al, "Reduced contact resistance of PEM fuel cell's bipolar plates via surface texturing," Journal of Power Sources 164 (2007), Jan. 3, 2007, pp. 697-703.

Zhou et al, "Contact resistance prediction and structure optimization of bipolar plates," Journal of Power Sources 159 (2006), Feb. 23, 2006, pp. 1115-1122.

"Office Action of Taiwan Counterpart Application", issued on Nov. 22, 2013, p. 1-p. 6.

Xu et al., "Dry-layer preparation of micro-porous layer for PEMFC," Chinese Journal of Power Sources, Jan. 2007, pp. 57-59.

"Office Action of China Counterpart Application", issued on Sep. 12, 2014, p. 1-p. 14.

* cited by examiner

BIPOLAR PLATE FOR FUEL CELL AND FUEL CELL

CROSS-REFERENCE TO RELATED APPLICATION

This application claims the priority benefit of Taiwan application serial no. 100147421, filed on Dec. 20, 2011. The entirety of the above-mentioned patent application is hereby incorporated by reference herein and made a part of this specification.

TECHNICAL FIELD

The technical field relates to a bipolar plate capable of improving performance of a fuel cell and a fuel cell having the bipolar plate.

BACKGROUND

As shown in FIG. 1A, a fuel cell is generally composed of a bipolar plate 100 with a membrane electrode assembly 102 in between. The bipolar plate 100 is generally made of a graphite material or a metallic material, and the bipolar plate 100 may have a plurality of flow channels 100a after mechanical processing (including milling, punching, stamping, . . . etc.) or chemical processing (including etching, electroplating . . . etc.). The flow channels 100a are used for fuel (e.g., hydrogen and oxygen) transportation. Hence, the length, the sectional shape, and the size of the flow channels 100a may affect electrochemical reaction in the membrane electrode assembly 102, and further affects the overall electricity generation efficiency of the fuel cell. In addition to the flow channels 100a, the majority of the bipolar plate 100 further includes a plurality of ribs 104. The ribs 104 are used for supporting the membrane electrode assembly 102, and transferring electrons during the electrochemical reaction of the fuel cell.

FIG. 1B merely illustrates a portion where the rib 104 depicted in FIG. 1A is in contact with the membrane electrode assembly 102, wherein the membrane electrode assembly 102 includes a gas diffusion layer (GDL) 106, a catalyst 108, and a membrane 110. Since the rib 104 is generally made of a graphite material or a metallic material, the fuel may not be able to pass through the ribs 104; thus, the fuel may diffuse only within areas 112. In this case, the catalyst 108 within the overlap between the rib 104 and thereof may be lack of fuel; thereby, the electrochemical reactions of the catalyst 108 may be blocked, the effective utilization of the catalyst 108 may be decrease, and the material of the fuel-lacking area may be degraded.

SUMMARY

One of exemplary embodiments comprises a bipolar plate for a fuel cell. The bipolar plate has a plurality of flow channels, wherein a rib is defined between neighboring two of the flow channels, and a top surface of the rib is a roughened surface.

One of exemplary embodiments comprises a bipolar plate for a fuel cell. The bipolar plate has a plurality of flow channels, wherein a rib is defined between neighboring two of the flow channels, and a top portion of the rib has a porous structure.

One of exemplary embodiments comprises a fuel cell including a plurality of bipolar plates and at least one membrane electrode assembly (MEA). The bipolar plates have the porous structure on the top surfaces of the ribs, and the MEA is disposed among the bipolar plates. The porous structure is compressed in contact with the MEA.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
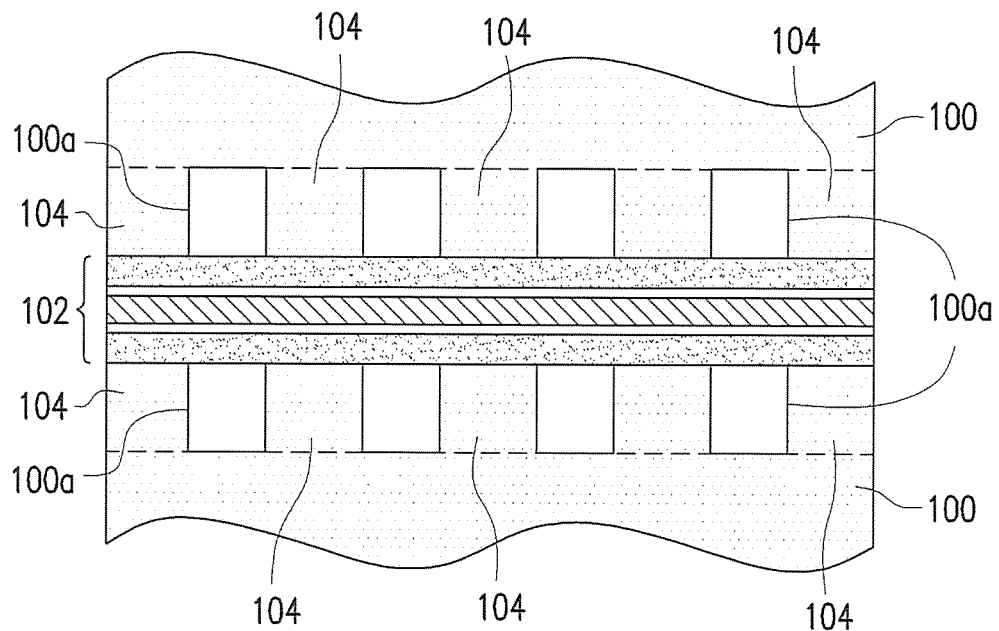
FIG. 1A is a cross-sectional view of a conventional fuel cell.
Figure 1B:
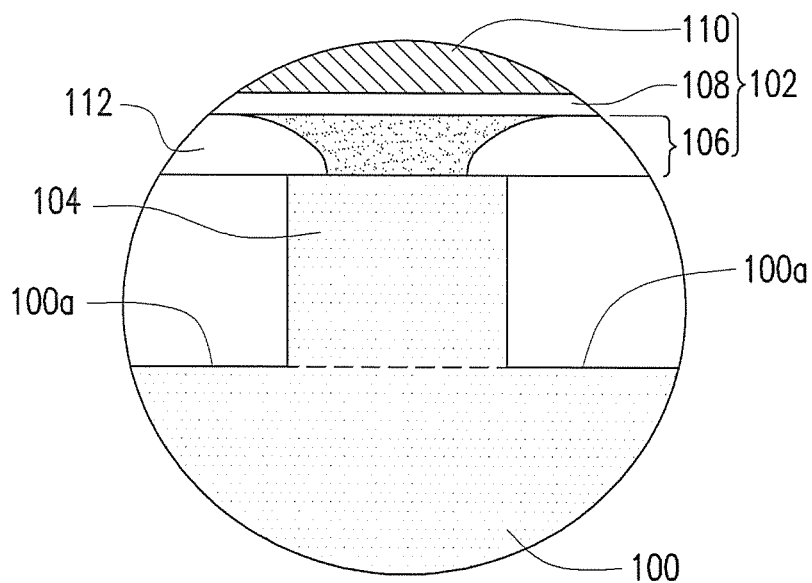
FIG. 1B is an enlarged partial view of FIG. 1A.
Figure 2:
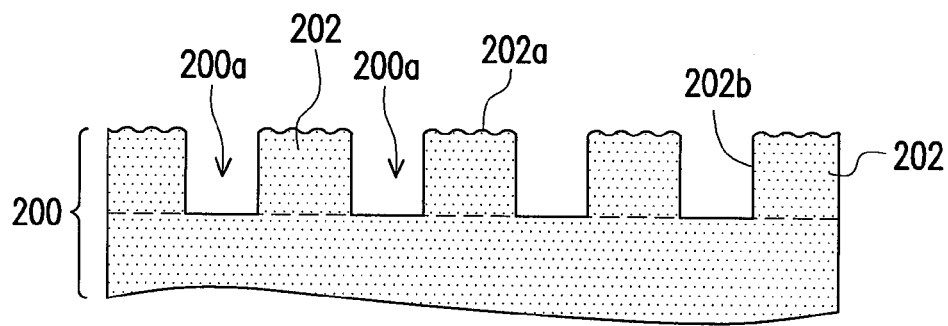
FIG. 2 is a schematic cross-sectional view of a bipolar plate for a fuel cell according to a first exemplary embodiment.

FIG. 2 is a schematic cross-sectional view of a bipolar plate for a fuel cell according to a first exemplary embodiment.

With reference to FIG. 2, a bipolar plate 200 of the first exemplary embodiment has a plurality of flow channels 200a, wherein a rib 202 is defined between neighboring two of the flow channels 200a, and a top surface of the rib 202 is a roughened surface 202a. Further, if a pore diameter of the roughened surface 202a of the rib 202 is approximately between 20 μm and 200 μm, the fuel supply (lateral diffusion) capacity may be increased to improve overall performance of the fuel cell.

In the first exemplary embodiment, if a pore area fraction of the roughened surface 202a of the rib 202 is approximately between 50% and 90%, the fuel supply capacity may also be increased. The so-called "pore area fraction" is the result of the following formula:

$$A_P/(A_R+A_P) \times 100\%$$

, wherein $A_R$ denotes the area of the top surface of the rib 202; $A_P$ denotes the pore area of the roughened surface 202a of the rib 202.

In addition, in the first exemplary embodiment, if roughness of the roughened surface 202a of the rib 202 is approximately between 0.1 μm and 10 μm, the fuel supply capacity may also be increased to improve the overall performance of the fuel cell.

A side surface 202b of the rib 202 may be a flat surface but is not limited thereto. The flow channels 200a are generally formed through mechanical processing, so that the bipolar plate 200 is an integral structure.

In the first exemplary embodiment, a material of the bipolar plate 200 may be metal, graphite, or a composite material. For example, the material of the bipolar plate 200 may be metal, such as aluminum, titanium, stainless steel, and so on. A protection film may be formed on all surfaces of the bipolar plate 200 in order to prevent the metal from oxidation. For example, when the bipolar plate 200 is made of titanium, a titanium nitride thin film may be deposited on the surface of the bipolar plate 200 to prevent titanium from oxidation and to maintain the conductivity of titanium.

Figure 3:
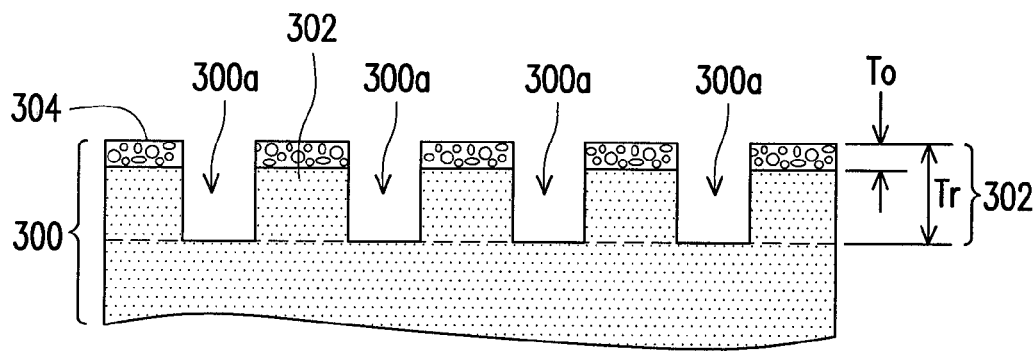
FIG. 3 is a schematic cross-sectional view of a bipolar plate for a fuel cell according to a second exemplary embodiment.

FIG. 3 is a schematic cross-sectional view of a bipolar plate for a fuel cell according to a second exemplary embodiment.

With reference to FIG. 3, a bipolar plate 300 of the second exemplary embodiment has a plurality of flow channels 300a, wherein a rib 302 is defined between neighboring two of the flow channels 300a. A top portion of the rib 302 has a porous structure 304 with hydrophobicity and a porosity range of, for example, 30%~80%. The thickness $T_0$ of the porous structure 304 is approximately 1/10 to 3/10 of the thickness $T_r$ of the rib 302.

In the second exemplary embodiment, the porous structure 304 is composed of a conductive material and a hydrophobic material but is not limited thereto. The conductive material may be, for example, carbon black, graphite, carbon fiber, or metal; the hydrophobic material includes any proper material, such as tetrafluoroethylene and the likes. The addition amount of the hydrophobic material, for example, is less than 60 wt %. The material of the bipolar plate 300 may be referred to as those described in the first exemplary embodiment.

Figure 4:
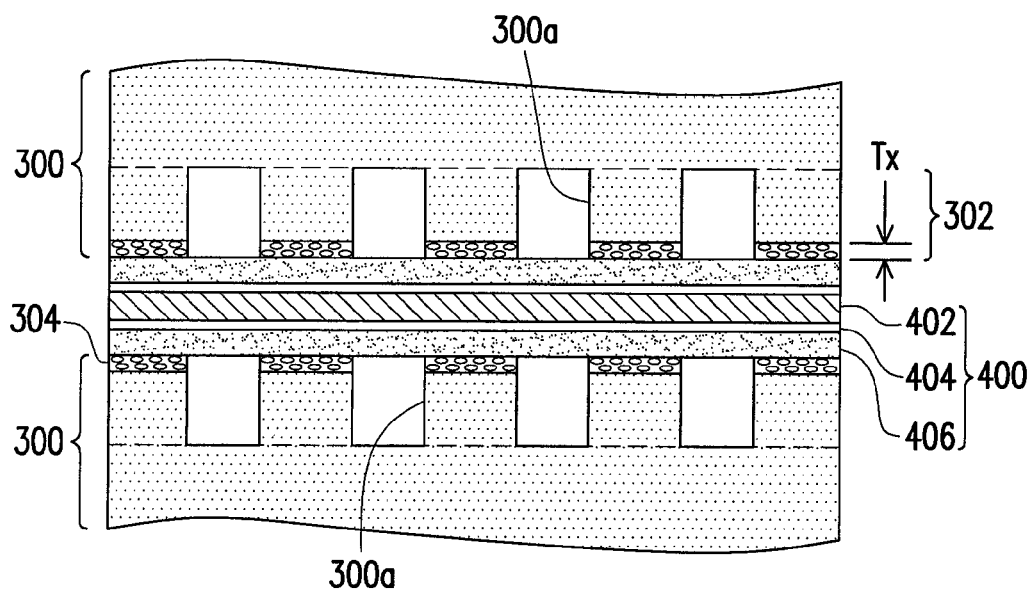
FIG. 4 is a schematic cross-sectional view of a fuel cell according to a third exemplary embodiment.

FIG. 4 is a schematic cross-sectional view of a fuel cell according to a third exemplary embodiment, wherein the reference numbers of the second exemplary embodiment are used to denote like or similar elements.

With reference to FIG. 4, the fuel cell of the third exemplary embodiment includes two bipolar plates 300 and a membrane electrode assembly (MEA) 400. The MEA 400 at least includes a membrane 402, a catalyst 404, and a gas diffusion layer (GDL) 406. The MEA 400 between the bipolar plates 300 is in contact with the bipolar plates 300 through the GDL 406. More particularly, a porous structure 304 on a top surface of a rib 302 is compressed in contact with the MEA 400. As such, not only the fuel supply (lateral diffusion) capacity may be increased, but also the conductivity between the rib 302 and the GDL 406 may be ensured. For example, the porosity of the porous structure 304 is in inverse proportion to the compression degree of the porous structure 304. The less the porosity, the greater the compression degree, and vice versa.

The so-called "compression degree" refers to the ratio of $(T_0-T_x)/T_0$, which is the original thickness $T_0$ of the porous structure 304 minus the thickness $T_x$ after forming the fuel cell, and divided by the original thickness $T_0$; for example, the compression degree of the porous structure 304 of the third exemplary embodiment is approximately between 40% and 80%.

Several experiments are described below to prove the efficacy of the above exemplary embodiments.

Reference Experiment

Figure 5A:
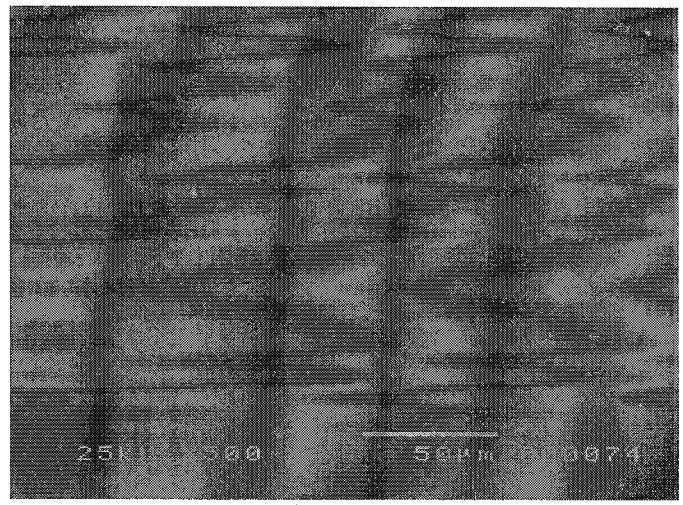
FIG. 5A is a SEM picture of a bipolar plate in Reference Experiment.

A graphite carbon plate is applied as a bipolar plate, and flow channels are formed on the bipolar plate through mechanical processing. The result is as shown in the SEM picture of FIG. 5A.

Experiment 1

Figure 5B:
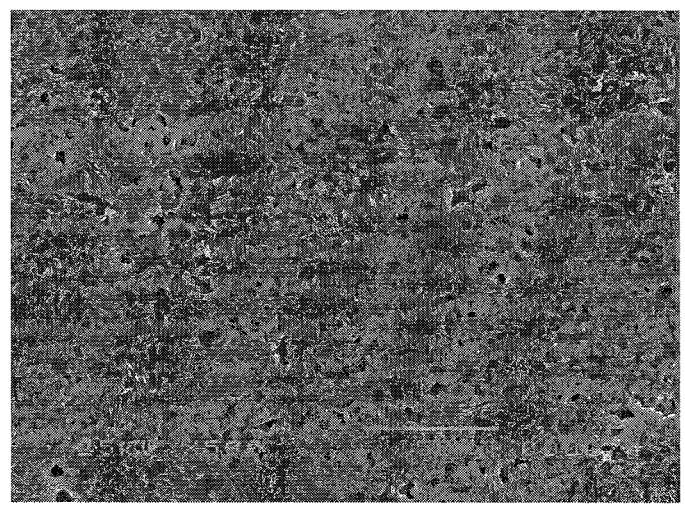
FIG. 5B is a SEM picture of a bipolar plate in Experiment 1.

Experiment 1 is similar to Reference Experiment. Namely, a graphite carbon plate is applied as a bipolar plate, except that after the flow channels are formed, the top surface of the rib is roughened through applying surface polishing and ultrasonic cavitation techniques. The result is as shown in the SEM picture of FIG. 5B. Upon comparison of FIG. 5A and FIG. 5B, it is known that the surface of the rib in contact with the MEA may be roughened through applying the surface treatment technique, and the pore diameter thereof is approximately 20 μm.

Experiment 2

Figure 5C:
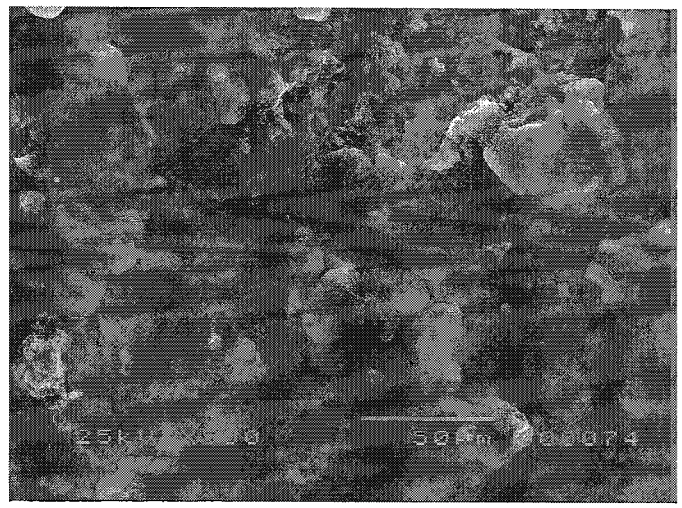
FIG. 5C is a SEM picture of a bipolar plate in Experiment 2.

Experiment 2 is similar to Reference Experiment. Namely, a graphite carbon plate is applied as a bipolar plate except that after the flow channels are formed, the top surface of the rib is roughened through applying an electrical discharge processing technique. The result is as shown in the SEM picture of FIG. 5C. Upon comparison of FIG. 5A and FIG. 5C, it is known that the surface of the rib in contact with the MEA is roughened through applying the surface treatment technique, and the pore diameter thereof is greater than 50 μm.

Experiment 3

Figure 5D:
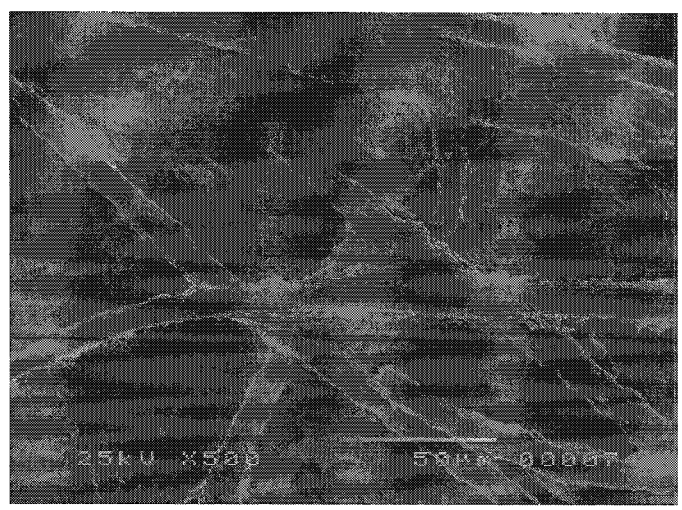
FIG. 5D is a SEM picture of a bipolar plate in Experiment 3.

Experiment 3 is similar to Reference Experiment. Namely, a graphite carbon plate is applied as a bipolar plate, except that after the flow channels are formed, the structure of the top portion of the rib is changed to a porous structure through applying a porous material lamination technique. The result of changing the surface portion of the rib is as shown in the SEM picture of FIG. 5D. In view of FIG. 5D, it is known that the porous material structure is composed of conductive carbon powder, carbon fiber, and hydrophobic material. The original porosity of the porous material is approximately 80%, while the hydrophobicity of the porous material is approximately 23%. After forming the fuel cell, the compression degree of the porous material is approximately 50%, while the porosity thereof is approximately 60%.

Measurement 1

Each "pore area fraction" of the bipolar plates is calculated from the SEM pictures of Reference Experiment and Experiments 1 and 2, and the roughness of the roughened surface of the rib of each of the bipolar plates is measured. The result is shown in TABLE 1 below.

TABLE 1

|  | Reference Experiment | Experiment 1 | Experiment 2 |
|---|---|---|---|
| Pore area fraction of the rib surface (%) | 5 | 63 | 77 |
| Average roughness Ra of the rib surface (μm) | 0.1~0.2 | 0.4~0.9 | 3.5~4.2 |

Measurement 2

Each of the bipolar plates provided in Reference Experiment and Experiments 1-3 is composed together with a MEA to form single cells, and a performance test is carried out on each of the single cells.

Figure 6:
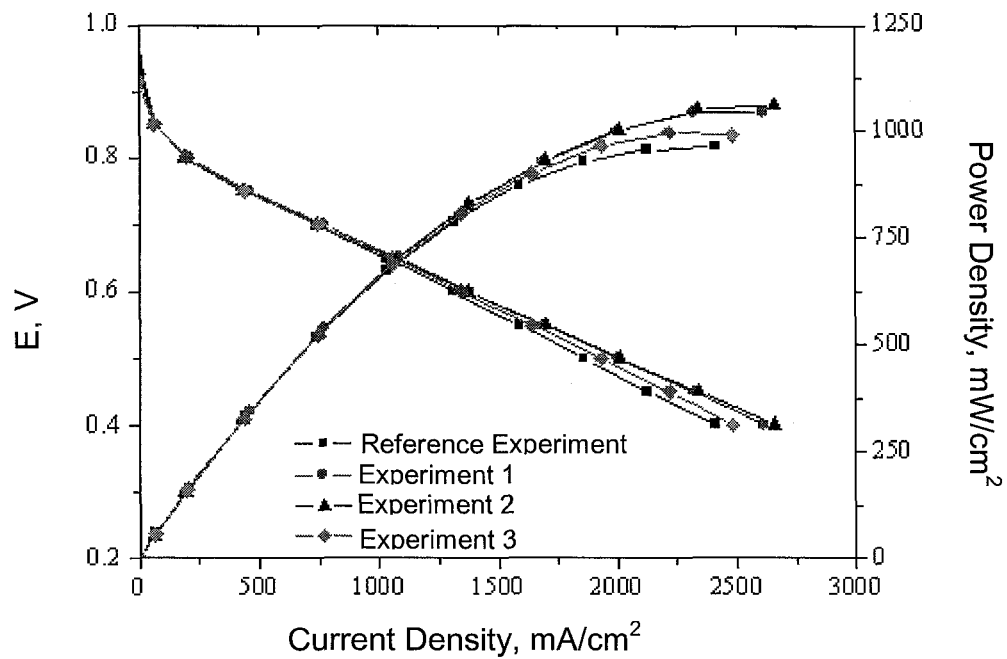
FIG. 6 is a polarization curve diagram of the fuel cells respectively using each of the bipolar plates provided in Reference Experiment and the Experiments on conditions of cell temperature at 66° C., the temperature of humidification being 60° C. at anode, and the temperature of humidification being 55° C. at cathode.

FIG. 6 is a polarization curve diagram of the fuel cells respectively using each of the bipolar plates provided in Reference Experiment and the Experiments under a humidified environment, in which the temperature of cell is 66° C., the temperature of anodic humidification is 60° C. and the temperature of cathodic humidification is 55° C. In view of FIG. 6, it is apparent that the performance of the fuel cells in Experiments 1-3 is better than that in Reference Experiment.

Figure 7:
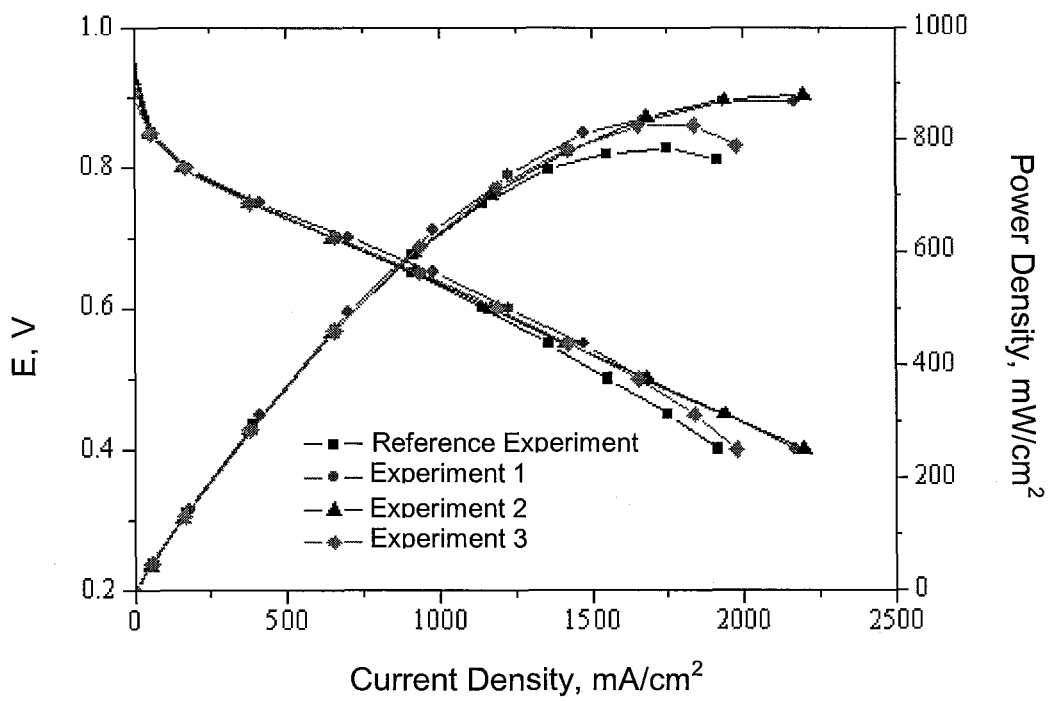
FIG. 7 is a polarization curve diagram of the fuel cells respectively using each of the bipolar plates provided in Reference Experiment and the Experiments on conditions of fuels with 65% RH and cell temperature at 70° C.

FIG. 7 is a polarization curve diagram of the fuel cells respectively using each of the bipolar plates provided in Reference Experiment and the Experiments on conditions of fuels with 65% RH and cell temperature at 70° C. It is also apparent that the performance of the fuel cells in Experiments 1-3 is better than that in Reference Experiment.

In view of the above, the disclosure utilizes surface structure processing technique to roughen the surface of the rib and to form the porous structure thereof, so as to respectively improve transmission of electrons (by reducing contact resistance) and enhance the fuel supply (lateral diffusion) capacity. As such, the overall performance of the fuel cell may be improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A bipolar plate for a fuel cell, the bipolar plate having a plurality of flow channels, wherein a rib is defined between neighboring two of the flow channels, and the bipolar plate is characterized in that: a porous structure is laminated on a top of the rib through a porous material lamination technique, the rib is nonporous, and a thickness of the porous structure is 1/10 to 3/10 of a thickness of the rib.

2. The bipolar plate for the fuel cell according to claim 1, wherein the porous structure comprises a conductive material and a hydrophobic material.

3. The bipolar plate for the fuel cell according to claim 2, wherein the conductive material comprises carbon black, graphite, carbon fiber or metal.

4. The bipolar plate for the fuel cell according to claim 2, wherein the hydrophobic material comprises tetrafluoroethylene.

5. The bipolar plate for the fuel cell according to claim 2, wherein an addition amount of the hydrophobic material is less than 60 wt %.

6. The bipolar plate for the fuel cell according to claim 1, wherein the porous structure has a porosity range of approximately 30% to 80% and hydrophobicity.

7. The bipolar plate for the fuel cell according to claim 1, wherein a material of the bipolar plate comprises metal, graphite, or a composite material.

8. A fuel cell, comprising:
a plurality of bipolar plates, wherein each of the bipolar plates has a plurality of flow channels, and a rib is defined between neighboring two of the flow channels; and
at least one membrane electrode assembly (MEA), disposed among the bipolar plates, wherein
a porous structure, laminated on a top of the rib through a porous material lamination technique, the rib is nonporous, a thickness of the porous structure is 1/10 to 3/10 of a thickness of the rib, and the porous structure is compressed in contact with the membrane electrode assembly.

9. The fuel cell according to claim 8, wherein the porous structure comprises a conductive material and a hydrophobic material.

10. The fuel cell according to claim 9, wherein the conductive material comprises carbon black, graphite, carbon fiber, or metal.

11. The fuel cell according to claim 9, wherein the hydrophobic material comprises tetrafluoroethylene.

12. The fuel cell according to claim 9, wherein an addition amount of the hydrophobic material is less than 60 wt %.

13. The fuel cell according to claim 8, wherein the porous structure has a porosity range of approximately 30% to 80% and hydrophobicity.

14. The fuel cell according to claim 8, wherein a material of the bipolar plate comprises metal, graphite, or a composite material.

15. The fuel cell according to claim 8, wherein the porous structure is compressed in contact with a gas diffusion layer of the membrane electrode assembly.

* * * * *